United States Patent
Cai et al.

(10) Patent No.: US 10,922,570 B1
(45) Date of Patent: Feb. 16, 2021

(54) ENTERING OF HUMAN FACE INFORMATION INTO DATABASE

(71) Applicant: NEXTVPU (SHANGHAI) CO., LTD., Shanghai (CN)

(72) Inventors: Haijiao Cai, Shanghai (CN); Xinpeng Feng, Shanghai (CN); Ji Zhou, Shanghai (CN)

(73) Assignee: NEXTVPU (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/678,838

(22) Filed: Nov. 8, 2019

Related U.S. Application Data

(63) Continuation of application No. PCT/CN2019/104108, filed on Sep. 3, 2019.

(30) Foreign Application Priority Data

Jul. 29, 2019 (CN) .......................... 2019 1 0686122

(51) Int. Cl.
*G06K 9/00* (2006.01)
*G06F 16/783* (2019.01)
(Continued)

(52) U.S. Cl.
CPC ....... *G06K 9/00926* (2013.01); *G06F 16/784* (2019.01); *G06F 16/7834* (2019.01);
(Continued)

(58) Field of Classification Search
CPC combination set(s) only.
See application file for complete search history.

(56) References Cited

U.S. PATENT DOCUMENTS 6,243,683 B1 * 6/2001 Peters ..................... G10L 15/24
434/4
6,567,775 B1 * 5/2003 Maali ................... G06K 9/6293
704/231
(Continued)

FOREIGN PATENT DOCUMENTS

CN 101021897 A 8/2007
CN 105512348 A 4/2016
(Continued)

OTHER PUBLICATIONS

Assisting Visually Impaired People with Mobility through Technology in the Age of Context A Survey, Martin Goldberg CUNY Graduate Center, New York, NY. USA, mgoldberg@gradcenter.cuny.edu, 2015.*

(Continued)

*Primary Examiner* — Mohammad K Islam
(74) *Attorney, Agent, or Firm* — Kilpatrick Townsend & Stockton LLP

(57) ABSTRACT

A processor chip circuit is provided, which is used for entering human face information into a database and includes a circuit unit configured to perform the steps of: videoing one or more videoed persons and extracting human face information of the one or more videoed persons from one or more video frames during the videoing; recording a voice of at least one of the one or more videoed persons during the videoing; performing semantic analysis on the recorded voice so as to extract respective information therefrom; and associating the extracted information with the human face information of the videoed person who has spoken the extracted information, and entering the associated information into the database.

15 Claims, 6 Drawing Sheets

(51) Int. Cl.
  *G10L 17/06* (2013.01)
  *G10L 17/00* (2013.01)
(52) U.S. Cl.
  CPC ..... *G06K 9/00255* (2013.01); *G06K 9/00288* (2013.01); *G06K 9/00718* (2013.01); *G10L 17/00* (2013.01); *G10L 17/06* (2013.01)

(56) References Cited

U.S. PATENT DOCUMENTS

| | | | | |
|---|---|---|---|---|
| 7,472,063 | B2* | 12/2008 | Nefian | G06K 9/6293 |
| | | | | 382/227 |
| 7,957,542 | B2* | 6/2011 | Sarrukh | G10K 11/341 |
| | | | | 367/118 |
| 8,700,392 | B1* | 4/2014 | Hart | G10L 15/25 |
| | | | | 704/231 |
| 8,913,103 | B1* | 12/2014 | Sargin | G06K 9/00221 |
| | | | | 348/14.12 |
| 9,317,736 | B1* | 4/2016 | Siddiqui | G06K 9/00221 |
| 9,390,726 | B1* | 7/2016 | Smus | G06F 3/017 |
| 9,641,585 | B2* | 5/2017 | Kvaal | H04L 65/605 |
| 9,832,583 | B2* | 11/2017 | Cohen | H04M 3/567 |
| 9,881,610 | B2* | 1/2018 | Connell, II | G10L 15/25 |
| 9,922,646 | B1* | 3/2018 | Blanksteen | H04S 7/302 |
| 9,984,314 | B2* | 5/2018 | Philipose | G06N 3/08 |
| 10,055,988 | B2* | 8/2018 | Warren | G07C 5/0808 |
| 10,305,895 | B2* | 5/2019 | Barry | G06F 21/00 |
| 10,374,816 | B1* | 8/2019 | Leblang | H04M 3/42204 |
| 2002/0106114 | A1 | 8/2002 | Yan et al. | |
| 2003/0154084 | A1 | 8/2003 | Li et al. | |
| 2004/0220705 | A1* | 11/2004 | Basir | B60R 21/01538 |
| | | | | 701/1 |
| 2009/0015651 | A1* | 1/2009 | Togami | H04N 7/15 |
| | | | | 348/14.01 |
| 2009/0055180 | A1* | 2/2009 | Coon | B60R 16/0373 |
| | | | | 704/251 |
| 2009/0150149 | A1* | 6/2009 | Culter | G06K 9/6293 |
| | | | | 704/246 |
| 2010/0194863 | A1* | 8/2010 | Lopes | G06T 7/12 |
| | | | | 348/50 |
| 2011/0224978 | A1* | 9/2011 | Sawada | G10L 15/32 |
| | | | | 704/231 |
| 2012/0069131 | A1* | 3/2012 | Abelow | G06Q 10/067 |
| | | | | 348/14.01 |
| 2013/0030811 | A1* | 1/2013 | Olleon | G06F 3/013 |
| | | | | 704/267 |
| 2013/0227678 | A1* | 8/2013 | Kang | G06K 9/00335 |
| | | | | 726/19 |
| 2014/0187219 | A1* | 7/2014 | Yang | H04W 4/023 |
| | | | | 455/418 |
| 2014/0237576 | A1* | 8/2014 | Zhang | G06F 21/32 |
| | | | | 726/7 |
| 2014/0365228 | A1* | 12/2014 | Ng-Thow-Hing | G06N 20/00 |
| | | | | 704/275 |
| 2015/0023256 | A1* | 1/2015 | Liu | H04L 51/38 |
| | | | | 370/329 |
| 2015/0058004 | A1* | 2/2015 | Dimitriadis | G10L 25/84 |
| | | | | 704/233 |
| 2015/0134330 | A1* | 5/2015 | Baldwin | G10L 17/06 |
| | | | | 704/232 |
| 2015/0154957 | A1* | 6/2015 | Nakadai | G06F 40/58 |
| | | | | 704/235 |
| 2015/0254058 | A1* | 9/2015 | Klein | G06F 3/167 |
| | | | | 704/275 |
| 2015/0324636 | A1* | 11/2015 | Bentley | A63F 13/00 |
| | | | | 386/227 |
| 2015/0340040 | A1* | 11/2015 | Mun | G10L 25/78 |
| | | | | 704/246 |
| 2016/0064000 | A1* | 3/2016 | Mizumoto | G06K 9/4647 |
| | | | | 704/233 |
| 2016/0082839 | A1* | 3/2016 | Ricci | B60C 1/00 |
| | | | | 701/36 |
| 2016/0100092 | A1* | 4/2016 | Bohac | G06F 3/16 |
| | | | | 382/103 |
| 2016/0140964 | A1* | 5/2016 | Connell, II | G10L 15/07 |
| | | | | 704/231 |
| 2016/0214618 | A1* | 7/2016 | Wulf | B60Q 9/00 |
| 2016/0217321 | A1* | 7/2016 | Gottlieb | G06K 9/00308 |
| 2016/0267911 | A1* | 9/2016 | Koetje | B60R 16/0373 |
| 2016/0358604 | A1* | 12/2016 | Dreuw | G10L 15/22 |
| 2016/0359941 | A1* | 12/2016 | Kvaal | H04N 7/147 |
| 2017/0068863 | A1* | 3/2017 | Rattner | G06K 9/00838 |
| 2017/0110121 | A1* | 4/2017 | Warford | G10L 17/06 |
| 2017/0113627 | A1* | 4/2017 | Ding | B60R 1/08 |
| 2017/0133036 | A1* | 5/2017 | Cohen | G06T 7/73 |
| 2017/0279815 | A1* | 9/2017 | Chung | H04L 9/3242 |
| 2017/0309275 | A1* | 10/2017 | Takayanagi | G10L 15/32 |
| 2017/0309289 | A1* | 10/2017 | Eronen | H04R 3/005 |
| 2017/0351485 | A1* | 12/2017 | Kohler | H01L 43/06 |
| 2018/0018964 | A1* | 1/2018 | Reilly | C12N 15/1135 |
| 2018/0059913 | A1* | 3/2018 | Penilla | H04W 4/48 |
| 2018/0077492 | A1* | 3/2018 | Yamada | H04R 3/12 |
| 2018/0107866 | A1* | 4/2018 | Li | G06K 9/00268 |
| 2018/0121161 | A1* | 5/2018 | Ueno | G10L 13/00 |
| 2018/0174583 | A1* | 6/2018 | Zhao | G10L 15/22 |
| 2018/0174600 | A1* | 6/2018 | Chaudhuri | G06K 9/00765 |
| 2018/0187969 | A1* | 7/2018 | Kim | G06F 3/04883 |
| 2018/0190282 | A1* | 7/2018 | Mohammad | G10K 11/17881 |
| 2018/0232201 | A1* | 8/2018 | Holtmann | G06F 3/0482 |
| 2018/0233147 | A1* | 8/2018 | Tukka | H04L 67/025 |
| 2018/0286404 | A1* | 10/2018 | Cech | G10L 15/25 |
| 2018/0336716 | A1* | 11/2018 | Ramprashad | G06F 3/04842 |
| 2018/0357040 | A1* | 12/2018 | Spiewla | G06K 9/00604 |
| 2019/0018411 | A1* | 1/2019 | Herbach | G05D 1/0088 |
| 2019/0037363 | A1* | 1/2019 | Tzirkel-Hancock | H04R 3/12 |
| 2019/0042871 | A1* | 2/2019 | Pogorelik | G06K 9/40 |
| 2019/0051304 | A1* | 2/2019 | Tian | G10L 25/51 |
| 2019/0073999 | A1* | 3/2019 | Premont | G10L 15/08 |
| 2019/0098003 | A1* | 3/2019 | Ota | H04L 63/12 |
| 2019/0176837 | A1* | 6/2019 | Williams | G06F 3/165 |
| 2019/0197755 | A1* | 6/2019 | Vats | G06T 13/205 |
| 2019/0246075 | A1* | 8/2019 | Khadloya | G06N 3/0427 |
| 2019/0265868 | A1* | 8/2019 | Penilla | B60N 2/0228 |
| 2019/0294629 | A1* | 9/2019 | Wexler | G06K 9/4604 |
| 2019/0313014 | A1* | 10/2019 | Welbourne | G06K 9/00892 |
| 2019/0325748 | A1* | 10/2019 | Tudi | G06K 9/00838 |
| 2019/0355352 | A1* | 11/2019 | Kane | G10L 17/06 |
| 2019/0356588 | A1* | 11/2019 | Shahraray | G06N 3/08 |
| 2020/0010051 | A1* | 1/2020 | Dumov | B60R 25/257 |

FOREIGN PATENT DOCUMENTS

| | | | |
|---|---|---|---|
| CN | 106782545 A | 5/2017 | |
| CN | 107632704 A | 1/2018 | |
| JP | 2019049829 A | 3/2019 | |
| WO | 9830017 A2 | 7/1998 | |
| WO | WO-2017138934 A1 * | 8/2017 | ............ G10L 15/08 |
| WO | 2018003196 A1 | 1/2018 | |
| WO | 2018150758 A1 | 8/2018 | |

OTHER PUBLICATIONS

Ben-Yacoub, et al., "Fusion of Face and Speech Data for Person Identity Verification", IDIAP Research Report 99-03, Jan. 1999, 20 pages.

Busso, et al., "Smart Room: Participant and Speaker Localization and Identification", Proceedings. (ICASSP '05). IEEE International Conference on Acoustics, Speech, and Signal Processing, 2005, pp. II-1117-II-1120.

Govindarajan, "Feature-Level Fusion in Multimodal Biometrics", West Virginia University, Graduate Theses, Dissertations, and Problem Reports. 1489, 2004, 121 pages.

Schroff, et al., "Clustering Videos by Location", Visual Geometry Group University of Oxford, Microsoft Research Microsoft Corp, 2004, pp. 1-11.

(56) References Cited

OTHER PUBLICATIONS

Frischholz, et al., "BioID: A Multimodal Biometric Identification System", IEEE, vol. 33, Issue 2, Feb. 2000, pp. 64-68.

* cited by examiner

ENTERING OF HUMAN FACE INFORMATION INTO DATABASE

CROSS-REFERENCES TO RELATED APPLICATIONS

This application claims priority to and is a continuation of International Patent Application No. PCT/CN2019/104108, filed Sep. 3, 2019; which claims priority from Chinese Patent Application No. CN 201910686122.3, filed Jul. 29, 2019. The entire contents of the PCT/CN2019/104108 application is incorporated by reference herein in its entirety for all purposes.

TECHNICAL FIELD

The present disclosure relates to human face recognition, and in particular to a method for entering human face information into a database, and a processor chip circuit and a non-transitory computer readable storage medium.

DESCRIPTION OF THE RELATED ART

Human face recognition is a biometric recognition technology for recognition based on human face feature information. The human face recognition technology uses a video camera or a camera to capture an image or a video stream containing a human face, and automatically detects the human face in the image, thereby performing human face recognition on the detected human face. Establishing a human face information database is a prerequisite for human face recognition. In the process of entering human face information into the database, the information corresponding to the captured human face information is usually entered by a user of an image and video capturing device.

BRIEF SUMMARY OF THE INVENTION

An objective of the present disclosure is to provide a method for entering human face information into a database, and a processor chip circuit and a non-transitory computer readable storage medium.

According to an aspect of the present disclosure, a method for entering human face information into a database is provided, the method including: videoing one or more videoed persons and extracting human face information of the one or more videoed persons from one or more video frames during the videoing; recording a voice of at least one of the one or more videoed persons during the videoing; performing semantic analysis on the recorded voice so as to extract respective information therefrom; and associating the extracted information with the human face information of the videoed person who has spoken the extracted information, and entering the associated information into the database.

According to another aspect of the present disclosure, a processor chip circuit is provided, which is used for entering human face information into a database and includes a circuit unit configured to perform the steps of the method above.

According to yet another aspect of the present disclosure, a non-transitory computer readable storage medium is provided, the storage medium having stored thereon a program which contains instructions that, when executed by a processor of an electronic device, cause the electronic device to perform the steps of the method above.

BRIEF DESCRIPTION OF THE DRAWINGS

The accompanying drawings exemplarily show the embodiments and constitute a part of the specification for interpreting the exemplary implementations of the embodiments together with the description of the specification. The embodiments shown are merely for illustrative purposes and do not limit the scope of the claims. In all the figures, the same reference signs refer to similar but not necessarily identical elements.

DETAILED DESCRIPTION OF THE INVENTION

In the present disclosure, unless otherwise stated, the terms "first", "second", etc., used to describe various elements are not intended to limit the positional, temporal or importance relationship of these elements, but rather only to distinguish one component from the other. In some examples, the first element and the second element may point to the same instance of the elements, and in some cases, based on contextual descriptions, they may also refer to different instances.

Figure 1:
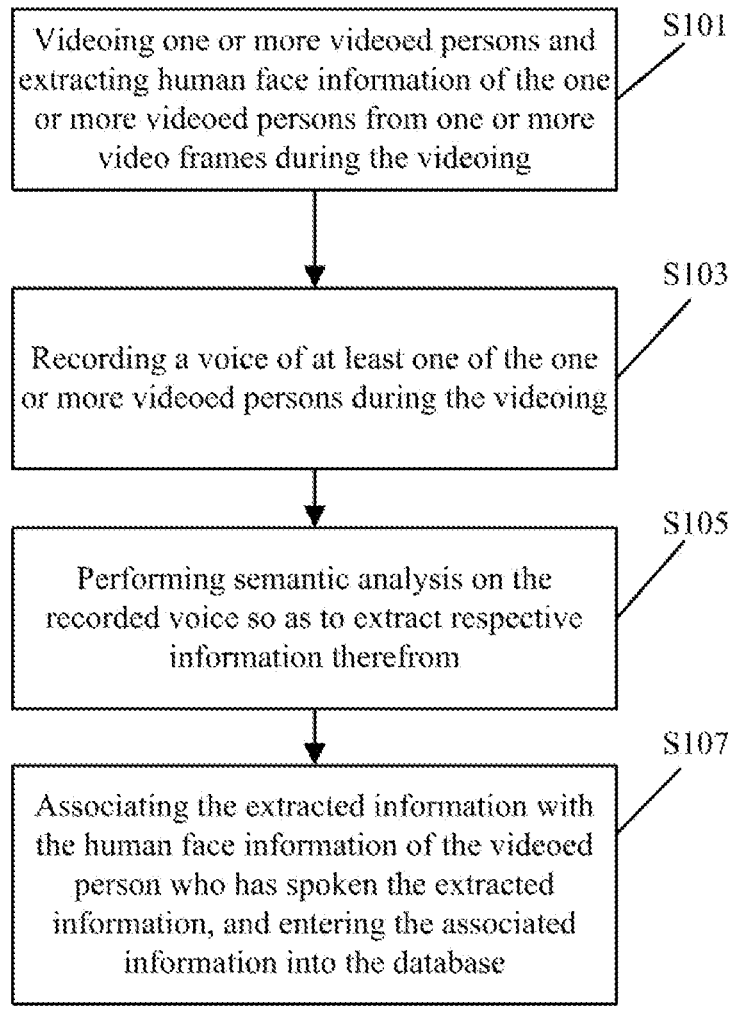
FIG. 1 shows a flow chart for associating human face information with information extracted from a voice according to a first implementation.

FIG. 1 shows a flow chart for associating human face information with information extracted from a voice according to a first implementation of the present disclosure.

Hereinafter, a scenario with only one videoed person is first described in accordance with the steps in FIG. 1. The scenario is, for example, a scenario where government department or bank staff needs to enter a human face and identity of a videoed person; or it is a scenario where a visually impaired person passively enters, by using an auxiliary wearable device, a human face and related information including the identity of the person speaking to him/her.

In step S101, one videoed person is videoed and human face information of the videoed person is extracted from one or more video frames during the videoing.

Videoing can be done with the aid of a video camera, a camera or other video capturing units with an image sensor. When the videoed person is within a videoing range of a video capturing unit, the video capturing unit can automatically search for the human face by means of the human face recognition technology, and then extract the human face information of the videoed person for human face recognition.

The human face information includes human face feature information that can be used to identify the videoed person. The features that can be used by a human face recognition system include visual features, pixel statistical features, human face image transform coefficient features, human face image algebra features, and the like. For example, the geometric description of a structural relationship among the parts such as the eyes, the nose, the mouth, the chin, etc. of the human face, and the iris can be both used as important features for recognizing the human face.

During human face recognition, the extracted human face information above is searched and matched with human face information templates stored in the database, and identity information of the human face is determined according to the degree of similarity. For example, the degree of similarity can be determined by training a neural network through deep learning.

In step S103, a voice of the videoed person during the videoing is recorded.

The voice can contain the speaker's own identity information; alternatively or additionally, the voice may also include information related to the scenario where the speaker himself/herself is located. For example, in a medical treatment scenario for a visually impaired person, the conversation content of a doctor may include not only the doctor's identity information, such as the name, his/her department and his/her position, but also effective voice information about a treatment mode, a medicine-taking way, etc.

The voice can be captured by an audio capturing unit such as a microphone. The videoed person actively spoke the information, e.g. his/her own identity information, "I am Wang Jun", etc. The identity information includes at least the name; however, depending on the purpose of the database, it may also include other information, such as age, place of birth, and the above-mentioned work unit and duty.

In step S105, semantic analysis is performed on the recorded voice, and corresponding information is extracted therefrom.

Extracting information from a voice can be realized with a voice recognition technology, and the extracted information can be stored in the form of texts. Based on a voice database for Chinese (including different dialects), English and other languages that is provided by a voice recognition technology provider, the information reported in multiple languages can be recognized. As described above, the extracted information may be the speaker's own identity information; alternatively or additionally, the extracted information may also include information related to the scenario where the speaker himself/herself is located. It should be noted that the identity information extracted by means of semantic analysis is different from voiceprint information of the speaker.

The degree of cooperation of the videoed person may affect the result of voice recognition. It can be understood that if the videoed person has clearly spoken the information at an appropriate speed, the result of the voice recognition will be more accurate.

In step S107, the extracted information is associated with the human face information of the videoed person who has spoken the extracted information, and the associated information is entered into the database.

In the scenario with only one videoed person, it can be determined that the extracted human face information and the extracted information belong to the same videoed person, and then the extracted human face information is stored in association with the extracted information in the database. The extracted information is stored in the database in the form of text information.

The above-mentioned human face information entry method automatically recognizes the information broadcast by the videoed person and associates same with the human face information thereof, thereby reducing the risk of a user of a video capturing unit erroneously entering information (especially identity information) of a videoed person, and improving the efficiency of human face information entry. Moreover, the method according to the present disclosure makes it possible to simultaneously enter other information related to the scenario, and thus can satisfy the user's usage requirements in different scenarios.

The steps in the flow chart of FIG. 1 can also be applied to the scenario with multiple videoed persons. The scenario is, for example, the one where a visually impaired person attends a multi-person conference or in a social occasion.

It should be understood that the human face recognition and voice recognition described above with respect to a single videoed person may be applied to each individual in the scenario including a plurality of videoed persons, respectively, and thus, related content will not be described again.

In step S101, a plurality of videoed persons are videoed and human face information of the videoed persons is extracted from one or more video frames during the videoing.

Figure 2:
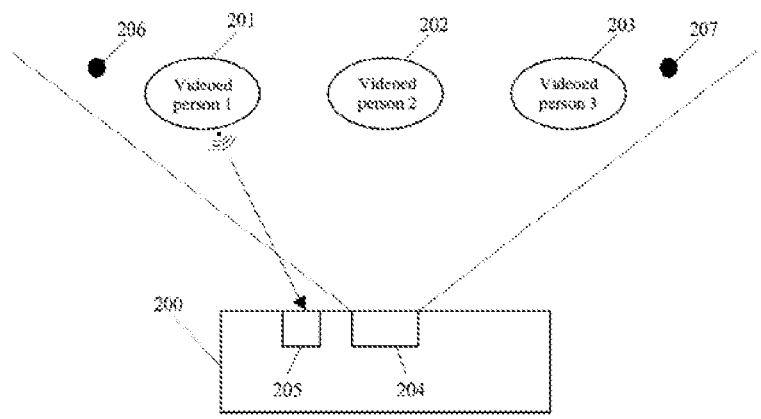
FIG. 2 exemplarily shows a scenario where human face information is entered for a plurality of videoed persons.

As shown in FIG. 2, within the videoing range of a video capturing unit 204 (a sector area defined by two dotted lines in FIG. 2), there are three videoed persons 201, 202, and 203 at the same time. The human face recognition technology is used to automatically search for the human faces of the plurality of videoed persons, and respective human face information is then extracted for all the videoed human faces.

In step S103, a voice of at least one of the plurality of videoed persons during the videoing is recorded.

The plurality of videoed persons can broadcast their own information in turn, and the recorded voices can be stored in a memory.

In step S105, semantic analysis is performed on each of the recorded voices, and respective information is extracted therefrom. It should be noted that, as described above, in addition to the identity information, the voice may also include information related to the scenario where the speaker is located, and such information may also be extracted by analyzing the voice, and stored in association with the human face information in the database. For the sake of brevity of explanation, the present disclosure will be illustrated below by taking the identity information in the voice as an example.

In step S107, the extracted information is associated with the human face information of the videoed person who has spoken the extracted information, and the associated information is entered into the database.

In the scenario including a plurality of videoed persons, it is possible to further distinguish between scenarios where only one person is speaking and where multiple persons are simultaneously speaking. In the case where the speaking of multiple persons causes serious interference with each other and cannot be distinguished, it is possible to choose to discard the voice recorded in the current scenario and perform voice recording again; the primary (or the only) sound in the recorded voice is analyzed to extract corresponding information when only one person is speaking, or when multiple persons are speaking but one sound can be distinguished from the others.

The association between the extracted respective information and the human face information can be implemented in the following two ways:

I. Sound Localization

In the scenario shown in a top view of FIG. 2, three videoed persons 201, 202 and 203 are located within the videoing range of the video capturing unit 204. Moreover, a device 200 for human face information entry further includes an audio capturing unit 205. It should be pointed out that FIG. 2 is not intended to define the relative positions between the audio capturing unit 205 and the video capturing unit 204.

The audio capturing unit 205 may be an array including three microphones, which are, for example, non-directional microphone elements that are highly sensitive to sound pressure.

Figure 3:
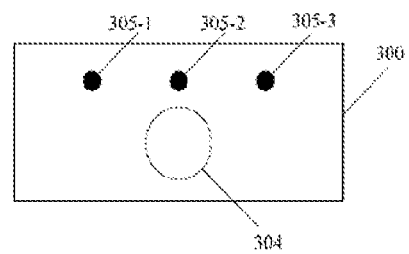
FIG. 3 shows a first arrangement of a microphone array and a camera.
Figure 4:
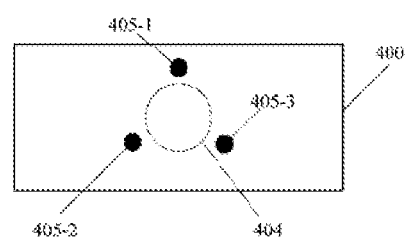
FIG. 4 shows a second arrangement of the microphone array and the camera.

In FIG. 3, three microphones 305-1, 305-2 and 305-3 are linearly arranged above a camera 304. In FIG. 4, three microphones 405-1, 405-2, and 405-3 form an equilateral triangle with a camera 404 as the centre.

The form of the array of microphones is not limited to the patterns in FIG. 3 and FIG. 4. It is important that the three microphones are respectively mounted at known and different positions on human face information entry devices 200, 300 and 400.

When one of the videoed persons 201, 202 and 203 broadcasts his/her own identity information, the sound waves from speaking are propagated to the three microphones 305-1, 305-2 and 305-3 of the audio capturing unit. Due to the different positions, there are phase differences among audio signals captured by the three microphones, and the direction of the sound source relative to the human face information entry device can be determined according to the information of the three phase differences. For example, as shown in FIG. 3, one microphone 305-2 of the three microphones 305-1, 305-2 and 305-3 may be disposed on the central axis of the human face information entry device 300 in a vertical direction, and the other two microphones 305-1 and 305-3 are symmetrically arranged with respect to the microphone 305-2, and the normal line passing through the microphone 305-2 and perpendicular to the plane in which they are located is used as a reference line to calibrate the specific direction of the sound source with an angle.

In the case shown in FIG. 2, the videoed person 1 is making a voice to broadcast his/her own identity information. By means of the audio capturing unit 205, the direction of the videoed person 1 with respect to the audio capturing unit 205 can be accurately determined. It should be understood that the accuracy of sound localization is related to the sensitivity of the microphone used by the audio capturing unit. If the spacing between videoed persons within the videoing range is large, the requirement for the accuracy of the sound localization is relatively low; on the contrary, if the spacing between the videoed persons within the videoing range is small, the requirement for the accuracy of the sound localization is relatively high. Based on the above teachings, during the implementation of the present disclosure, those skilled in the art can determine the performance of the audio capturing unit according to a specific application scenario (for example, according to the number of persons within the videoing range at the same time).

The video capturing units 304 and 404 can be used to map the real scenario where the videoed persons are located with the video scenario in terms of the location. This mapping can be achieved by pre-setting reference markers 206 and 207 in the real scenario (in this case, the distance from the video capturing unit to the reference marker is known), or by using a ranging function of the camera.

The use of camera ranging can be achieved in the following manner:

1) photographing a multi-view image: in the case where parameters of the camera of the video capturing units 304 and 404 are known, a sensor (such as a gyroscope) inside the device can be used to estimate the change of angle of view of the camera and the displacement of the video capturing unit, thereby inferring an actual spatial distance corresponding to the displacement of pixels in the image; or 2) photographing multiple images with different depths of focus by using a defocus (depth from focus) method, and then performing depth estimation by using the multiple images.

Based on the location mapping between the real scenario and the video scenario, a corresponding position of a certain location in the real scenario in the videoed video frame can be determined. For example, in the scenario of FIG. 2, in the case where the positions of the three videoed persons 201, 202 and 203 in the real scenario relative to the video capturing unit 204, the direction of the speaker 201 relative to the audio capturing unit 205, and the relative distance between the audio capturing unit 205 and the video capturing unit 204 are known, the position of the speaker (the videoed person 1) in the video frames can be derived, thereby associating the extracted identity information with the extracted human face information.

II. Capturing Lip Movements

The sound localization described above involves the association between audio and video in terms of spatial location, while the implementation of capturing lip movements involves the association between audio and video in terms of time.

It is beneficial to simultaneously start the video capturing unit and the audio capturing unit, and separately record video and audio.

Figure 5:
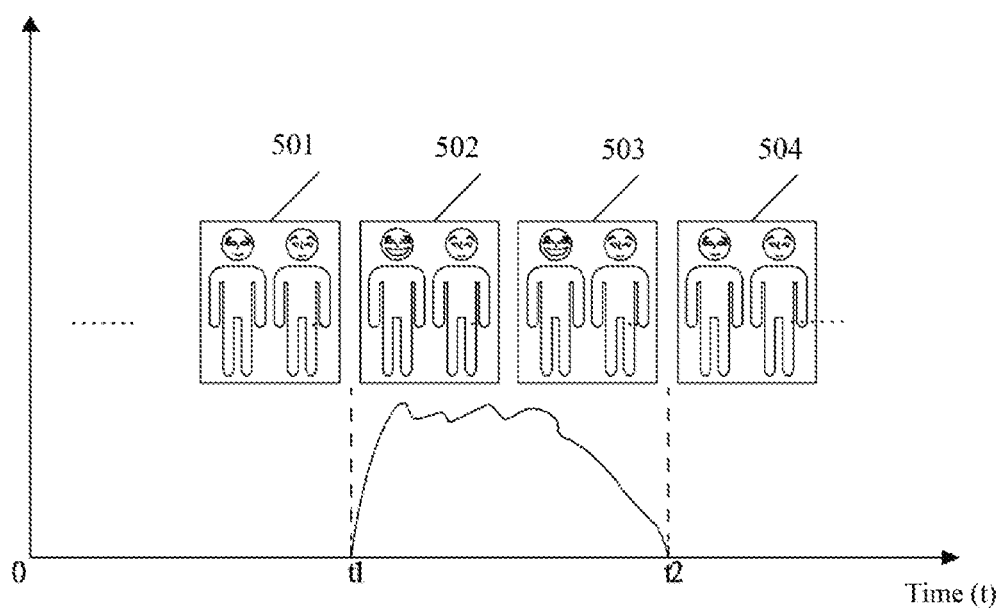
FIG. 5 exemplarily displays a video image in association with an audio waveform based on a common time axis.

In FIG. 5, the videoed video is displayed in association with the recorded audio waveform by a common time axis.

When the audio capturing unit detects that an audio signal is entered in a time interval from t1 to t2, and the identity information can be extracted therefrom effectively (excluding noise), the human face information entry devices 200, 300 and 400 retrieve the recorded video frames, and compare a frame 502 at time t1 and a frame 501 at a previous time (for example, before 100 ms). By comparison, it can be determined that the lip of the videoed person on the left side has an obvious opening action in the frame 502; similarly, a frame 503 at time t2 and a frame 504 at a later time (for example, after 100 ms) are compared; and by comparison, it can be determined that the videoed person on the left side ends the opening state of his/her lip in the frame 504.

Based on the high degree of time consistency, it can be determined that the identity information captured by the audio capturing unit within the time interval from t1 to t2 should be associated with the videoed person on the left side.

The above method for associating identity information with human face information by capturing lip movements can not only be used to reinforce the implementation of sound localization, but also can be separately used as an alternative to the sound localization.

By associating the identity information with the human face information, it is possible to enter information of a plurality of videoed persons during the same videoing, which further saves the time required for human face information entry, and can also assist a visually impaired person in quickly grasping identity information of persons present in a large conference or social occasion and storing the identity information of strangers in association with the corresponding human face information in the database. Once the database is established, during the following conversation, the position of the speaker in a video frame can be determined by the localization technique explained above, and the human face recognition can be performed to provide the visually impaired person with the identity information of the current speaker, for example, through a loudspeaker, thereby providing great convenience for the visually impaired person to participate normal social activities.

Moreover, in the scenario where multiple persons are speaking, it is also possible to accurately analyse corresponding semantics according to the videoed video of lip movements, split different sound sources by means of the audio capturing device, and compare the analyzed semantics on the video of lip movements with information of a single channel of sound source split by the audio capturing device for association.

Figure 6:
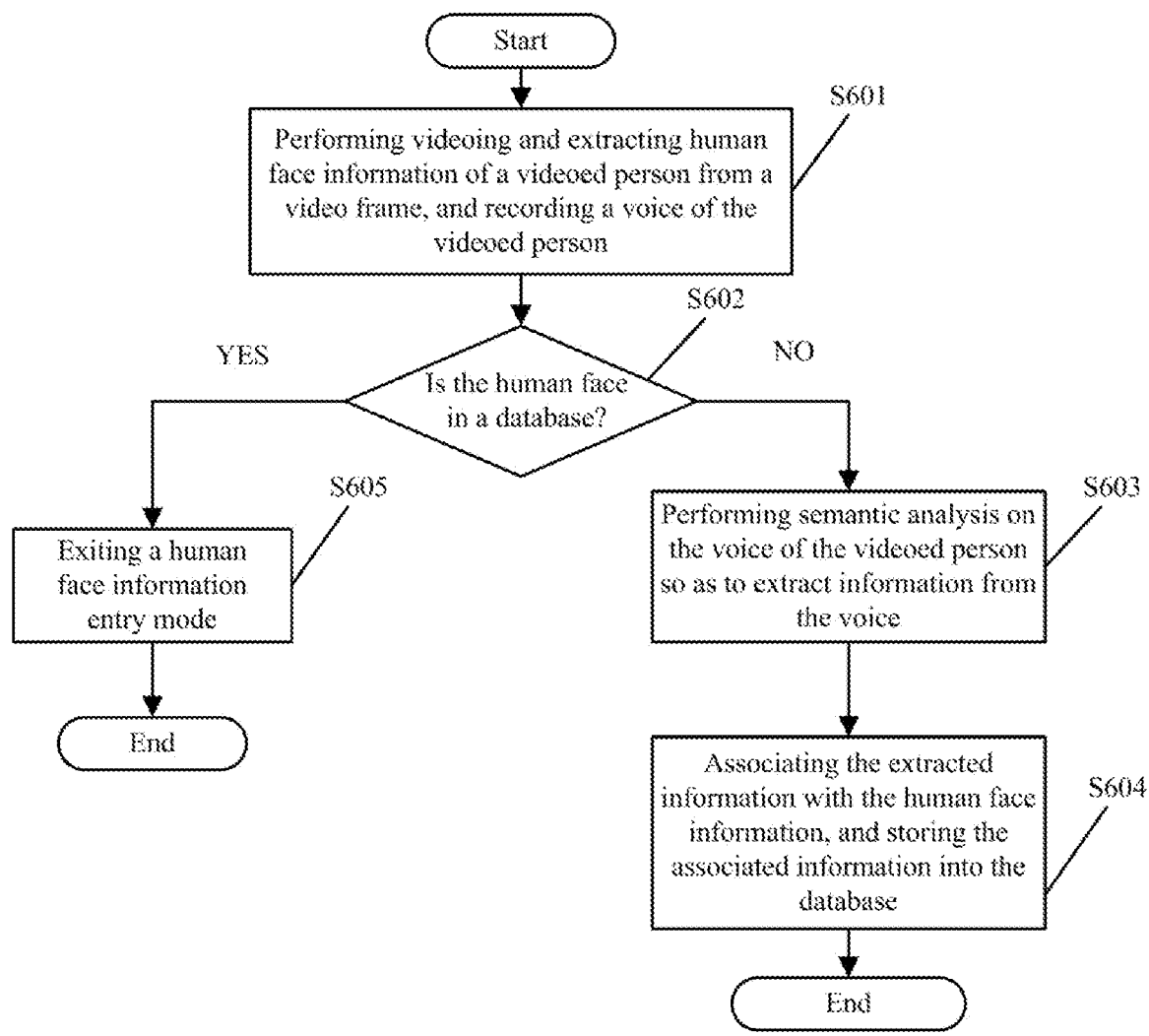
FIG. 6 shows a flow chart for associating human face information with information extracted from a voice according to a second implementation.

FIG. 6 shows a flow chart for entering human face information in association with the extracted respective information into a database according to a second implementation of the present disclosure.

Unlike the implementation shown in FIG. 1, in the second implementation, it is determined whether the extracted human face information is already stored in the database before the respective information is extracted from the voice.

In step S601, one or more videoed persons are videoed and human face information of the one or more videoed persons is extracted from one or more video frames, and voices of the one or more videoed persons are recorded.

In step S602, the extracted human face information is compared with human face information templates that is already stored in the database.

If it is determined that the human face information has been stored in the database, the process proceeds to step S605 to exit a human face information entry mode.

If it is determined that the human face information has not been stored in the database, the process proceeds to S603 to start to perform semantic analysis on the voices of the one or more videoed persons that are recorded in step 601, and to extract respective information from the voices.

Preferably, when the name to be entered is already stored in the database (the corresponding human face information is different), the name to be entered may be distinguished and then entered into the database. For example, when "Wang Jun" is already in the database, "Wang Jun 2" is entered so as to distinguish from "Wang Jun" that has been entered into the database, so that during subsequent broadcast to a user, a different voice information code name is used to make the user to distinguish between different human face information.

In step S604, the extracted information is associated with the human face information and entered into the database. The manner in which the sound and the human face are associated as described above in connection with FIGS. 1 to 5 can also be applied to the second implementation.

According to the second implementation, the efficiency of entering the extracted information and the human face information can be further improved.

It should be noted that the respective information including the identity extracted according to the present disclosure is text information recognized from voice information of an audio format, and therefore, the above information is stored in the database as text information instead of voice information.

Figure 7:
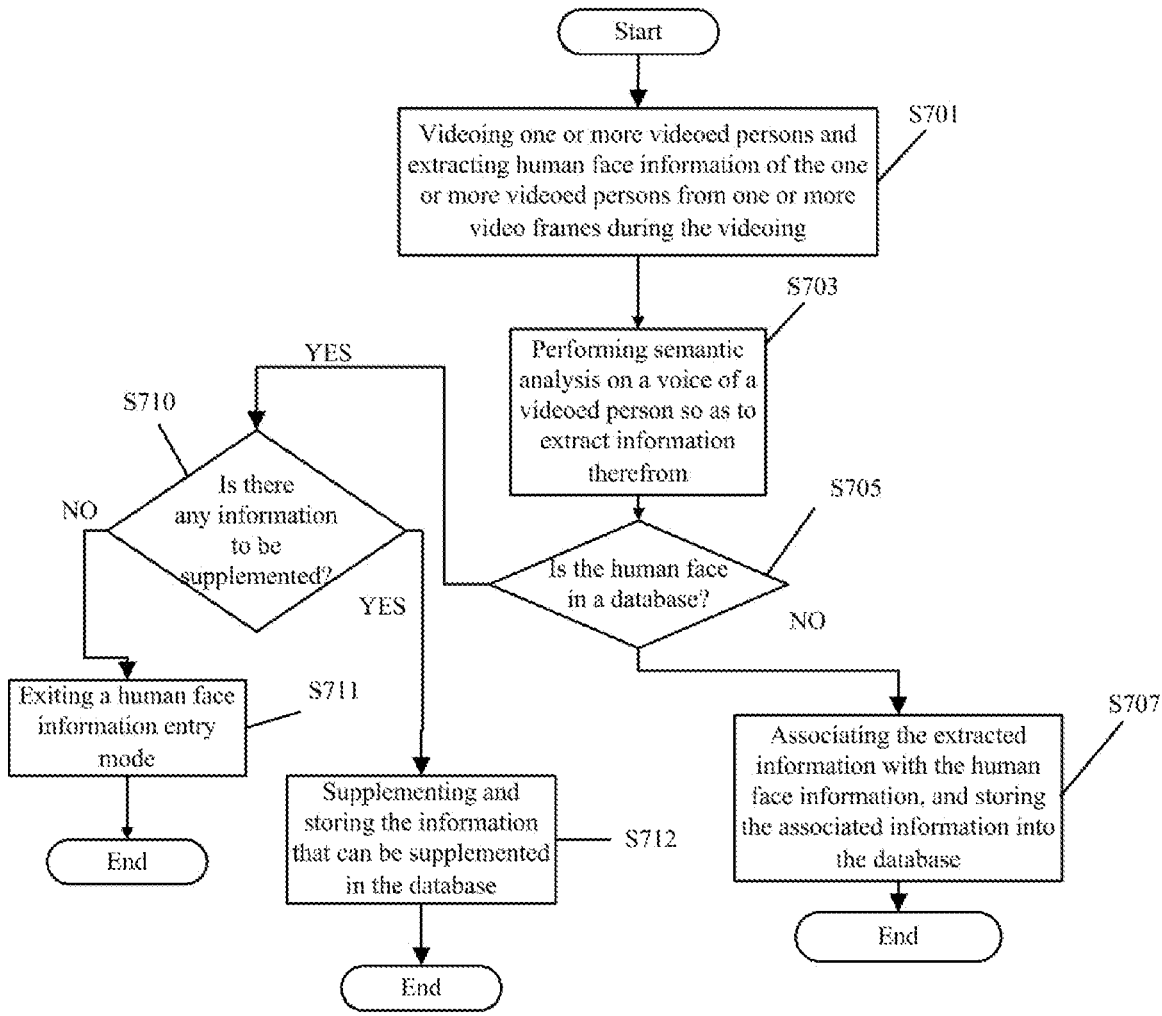
FIG. 7 shows a flow chart for associating human face information with information extracted from a voice according to a third implementation.

FIG. 7 shows a flow chart of entering human face information in association with identity information into a database according to a third implementation of the present disclosure.

In step S701, one or more videoed persons are videoed and human face information of the one or more videoed persons is extracted from one or more video frames during the videoing.

In step S703, semantic analysis is performed on a voice of a videoed person during the videoing, and the voice can contain the speaker's own identity information.

In step S705, it is determined whether the extracted human face information is already in the database.

If it is found, after determination, that the relevant human face information has not been stored in the database, the process proceeds to step S707, and the extracted information is stored in association with the human face information in the database. Here, the manner in which the sound and the human face are associated as described above in connection with FIGS. 1 to 5 can also be applied to the third implementation.

If it is found, after determination, that the relevant human face information is already stored in the database, the process proceeds to S710 to further determine whether the extracted information can supplement the information that is already in the database. For example, the name of the videoed person already exists in the database, and the extracted information further includes other information such as age and place of birth, or new information related to the scenario where the speaker is located.

If there is no other information that can be supplemented to the database, the process proceeds to S711 to exit the human face information entry mode.

If there is other information that can be supplemented to the database, the process proceeds to S712 to store the information that can be supplemented in the database.

According to the third implementation, a more comprehensive identity information database can be acquired with higher efficiency.

Figure 8:
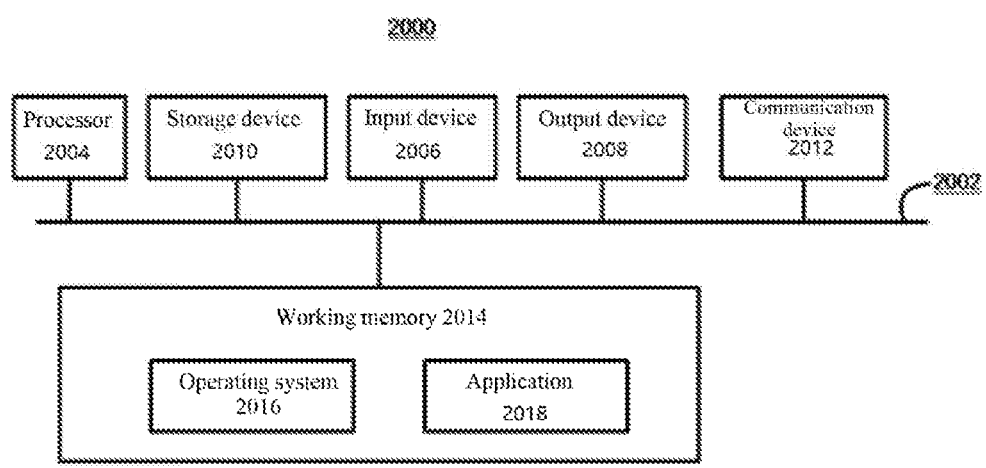
FIG. 8 shows a structural block diagram of an exemplary computing device that can be applied to an exemplary embodiment.

FIG. 8 is a computing device 2000 for implementing the methods or processes of the present disclosure, which is an example of a hardware device that can be applied to various aspects of the present disclosure. The computing device 2000 can be any machine configured to perform processing and/or computation. In particular, in the above-mentioned conference or social occasion where multiple persons are present, the computing device 2000 can be implemented as a wearable device, preferably as smart glasses. Moreover, the computing device 2000 can also be implemented as a tablet computer, a smart phone, or any combination thereof. The apparatus for human face information entry according to the present disclosure may be implemented, in whole or at least in part, by the computing device 2000 or a similar device or system.

The computing device 2000 may include elements in connection with a bus 2002 or in communication with a bus 2002 (possibly via one or more interfaces). For example, the computing device 2000 can include a bus 2002, one or more processors 2004, one or more input devices 2006, and one or more output devices 2008. The one or more processors 2004 may be any type of processors and may include, but are not limited to, one or more general purpose processors and/or one or more dedicated processors (e.g., special processing chips). The input device 2006 can be any type of devices capable of inputting information to the computing device 2000, and can include, but is not limited to, a camera. The output device 2008 can be any type of devices capable of presenting information, and can include, but is not limited to, a loudspeaker, an audio output terminal, a vibrator, or a display. The computing device 2000 may also include a non-transitory storage device 2010 or be connected to a non-transitory storage device 2010. The non-transitory storage device may be non-transitory and may be any storage device capable of implementing data storage, and may include, but is not limited to, a disk drive, an optical storage device, a solid-state memory, a floppy disk, a flexible disk, a hard disk, a magnetic tape, or any other magnetic medium, an optical disk or any other optical medium, a read-only memory (ROM), a random access memory (RAM), a cache memory and/or any other memory chip or cartridge, and/or any other medium from which a computer can read data, instructions and/or codes. The non-transitory storage device 2010 can be detached from an interface. The non-transitory storage device 2010 may have data/programs (including instructions)/codes for implementing the methods and steps. The computing device 2000 can also include a communication device 2012. The communication device 2012 may be any type of device or system that enables communication with an external device and/or a network, and may include, but is not limited to, a wireless communication device and/or a chipset, e.g., a Bluetooth device, a 1302.11 device, a WiFi device, a WiMax device, a cellular communication device and/or the like.

The computing device 2000 may also include a working memory 2014, which may be any type of working memory that stores programs (including instructions) and/or data useful to the working of the processor 2004, and may include, but is not limited to, a random access memory and/or a read-only memory.

Software elements (programs) may be located in the working memory 2014, and may include, but is not limited to, an operating system 2016, one or more applications 2018, drivers, and/or other data and codes. The instructions for executing the methods and steps may be included in the one or more applications 2018.

When the computing device 2000 shown in FIG. 8 is applied to an embodiment of the present disclosure, the memory 2014 may store program codes, and the videoed video and/or audio files for performing the flow charts shown in FIGS. 1, 6 and 7, in which the application 2018 may include a human face recognition application, a voice recognition application, a camera ranging application, etc. provided by a third party. The input device 2006 may be a sensor, such as a camera and a microphone, for acquiring video and audio. The storage device 2010 is used, for example, to store a database such that the associated identity information and human face information can be written into the database. The processor 2004 is used for performing, according to the program codes in the working memory 2014, the steps of the methods according to various aspects of the present disclosure.

It should also be understood that the components of the computing device 2000 can be distributed over a network. For example, some processing may be executed by one processor while other processing may be executed by another processor away from the one processor.

Other components of the computing device 2000 may also be similarly distributed. As such, the computing device 2000 can be interpreted as a distributed computing system that performs processing at multiple positions.

Although the embodiments or examples of the present disclosure have been described with reference to the accompanying drawings, it should be understood that the methods, systems and devices described above are merely exemplary embodiments or examples, and the scope of the present disclosure is not limited by the embodiments or examples, but only defined by the claims and equivalent scopes thereof. Various elements in the embodiments or examples may be omitted or substituted by equivalent elements thereof. Moreover, the steps may be executed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A processor chip circuit for entering human face information into a database, comprising:
  a circuit unit coupled with an auxiliary wearable device configured for being worn by a visually impaired person, the circuit unit being configured to perform, from the auxiliary wearable device, the steps of:
  videoing one or more videoed persons and extracting human face information of the one or more videoed persons from one or more video frames during the videoing;
  recording a voice of at least one of the one or more videoed persons during the videoing, wherein the voice of the at least one videoed person comprises identity information of a speaker that is spoken by the speaker;
  performing semantic analysis on the recorded voice so as to extract respective information therefrom, wherein the extracted respective information comprises the identity information of the speaker; and
  associating the extracted information with the human face information of the videoed person who has spoken the extracted information, and entering the associated information into the database,
  wherein the circuit unit is further configured to perform, from the auxiliary wearable device, the step of:
  accessing, during a conversation participated by the visually impaired person and at least one of the one or more videoed persons, the database having the entered associated information to provide the visually impaired person with the identity information of the speaker.

2. The processor chip circuit according to claim 1, wherein associating the extracted information with the human face information of the videoed person who has spoken the extracted information comprises:
  analyzing the movement of lips of the one or more videoed persons from the one or more video frames during the videoing.

3. The processor chip circuit according to claim 2, wherein a start time of the movement of the lips is compared with a start time at which the voice is recorded.

4. A method for entering human face information into a database, comprising:
  videoing, from an auxiliary wearable device configured for being worn by a visually impaired person, one or more videoed persons and extracting human face information of the one or more videoed persons from one or more video frames during the videoing;
  recording, from the auxiliary wearable device, a voice of at least one of the one or more videoed persons during the videoing, wherein the voice of the at least one videoed person comprises identity information of a speaker that is spoken by the speaker;

performing, from the auxiliary wearable device, semantic analysis on the recorded voice so as to extract respective information therefrom, wherein the extracted respective information comprises the identity information of the speaker; and associating, from the auxiliary wearable device, the extracted information with the human face information of the videoed person who has spoken the extracted information, and entering the associated information into the database, wherein the method further comprises:

accessing, from the auxiliary wearable device, the database having the entered associated information to provide the visually impaired person with the identity information of the speaker, during a conversation participated by the visually impaired person and at least one of the one or more videoed persons.

5. The method according to claim 4, wherein the human face information comprises face feature information for identifying the one or more videoed persons.

6. The method according to claim 4, wherein the voice of the at least one videoed person comprises identity information of a speaker, and the extracted respective information comprises the identity information of the speaker.

7. The method according to claim 4, wherein the identity information of the speaker comprises a name of the speaker.

8. The method according to claim 4, wherein the voice of the at least one videoed person comprises information related to a scenario where a speaker is located, and the extracted respective information comprises the information related to the scenario where the speaker is located.

9. The method according to claim 4, wherein associating the extracted information with the human face information of the videoed person who has spoken the extracted information comprises:

analyzing the movement of lips of the one or more videoed persons from the one or more video frames during the videoing.

10. The method according to claim 9, wherein a start time of the movement of the lips is compared with a start time at which the voice is recorded.

11. The method according to claim 4, wherein it is detected whether the human face information of the at least one videoed person is already stored in the database, and if the human face information of the at least one videoed person is not in the database, the recorded voice is analyzed.

12. The method according to claim 4, wherein it is detected whether the human face information of the at least one videoed person is already stored in the database, and if the human face information of the at least one videoed person has been stored in the database, the extracted information is used to supplement information associated with the human face information of the at least one videoed person that is already stored in the database.

13. The method according to claim 4, wherein the extracted information is stored in the database as text information.

14. A non-transitory computer readable storage medium storing a program which comprises instructions that, when executed by a processor of an electronic device, cause the electronic device to perform the steps of:

videoing, from an auxiliary wearable device configured for being worn by a visually impaired person, one or more videoed persons and extracting human face information of the one or more videoed persons from one or more video frames during the videoing;

recording, from the auxiliary wearable device, a voice of at least one of the one or more videoed persons during the videoing, wherein the voice of the at least one videoed person comprises identity information of a speaker that is spoken by the speaker;

performing, from the auxiliary wearable device, semantic analysis on the recorded voice so as to extract respective information therefrom, wherein the extracted respective information comprises the identity information of the speaker; and associating, from the auxiliary wearable device, the extracted information with the human face information of the videoed person who has spoken the extracted information, and entering the associated information into the database, wherein the instructions, when executed by the processor, further cause the electronic device to perform the step of:

accessing, from the auxiliary wearable device, the database having the entered associated information to provide the visually impaired person with the identity information of the speaker, during a conversation participated by the visually impaired person and at least one of the one or more videoed persons.

15. The non-transitory computer readable storage medium according to claim 14, wherein associating the extracted information with the human face information of the videoed person who has spoken the extracted information comprises:

analyzing the movement of lips of the one or more videoed persons from the video frames during the videoing.

* * * * *